Figure 4:
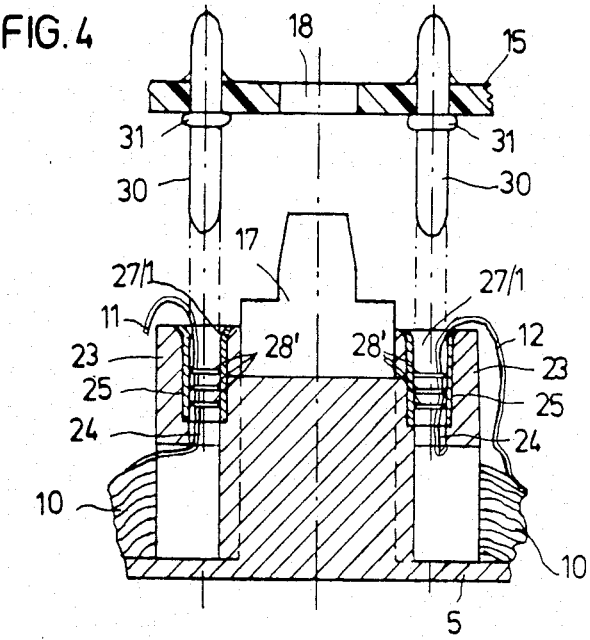

United States Patent [19]

Wrobel

[11] Patent Number: 4,673,834
[45] Date of Patent: Jun. 16, 1987

[54] ENAMELLED WIRE CONNECTION FOR CIRCUIT BOARDS

[75] Inventor: Guenter Wrobel, Villingen, Fed. Rep. of Germany

[73] Assignee: Papst-Motoren GmbH & Co. KG, Black Forest, Fed. Rep. of Germany

[21] Appl. No.: 829,623

[22] Filed: Feb. 13, 1986

[30] Foreign Application Priority Data

Feb. 14, 1985 [DE] Fed. Rep. of Germany ....... 3505092

[51] Int. Cl.⁴ ........................................... H01R 11/20
[52] U.S. Cl. ..................................... 310/71; 439/426; 439/391
[58] Field of Search ................. 29/596, 598, 857, 861, 29/866; 310/42, 71, 68 R, 68 D, 208; 339/95 R, 96, 97 R

[56] References Cited

U.S. PATENT DOCUMENTS

| 2,740,059 | 3/1956 | Conery | 310/71 |
| 3,014,140 | 12/1961 | Tupper | 310/71 |
| 3,502,917 | 3/1970 | Bizoe | 310/71 |
| 4,132,460 | 1/1979 | Porta | 310/71 |
| 4,143,237 | 3/1979 | Atkins | 339/95 R |

FOREIGN PATENT DOCUMENTS 1428359 3/1976 United Kingdom ............. 339/97 R

Primary Examiner—Patrick R. Salce
Assistant Examiner—D. L. Rebsch
Attorney, Agent, or Firm—Fitch, Even, Tabin & Flannery

[57] ABSTRACT

Disclosed is an arrangement for providing an electrical connection to the enamelled wire of a coil of an electrical motor. The arrangement includes a circuit board carrying at least one conductive component such as an electrical trace on the surface of the circuit board. A conductive pin-type contact, also carried by the circuit board, is electrically connected to the conductive component. An insulating body is carried by the electrical motor and includes passageways for receiving at least two pin-receiving receptacle terminals. The receptacle terminals have inwardly-extending rib members for engaging the enamelled wire when the enamelled wire and the pin-type contact are inserted therein. The rib members are operative to penetrate the enamel covering to establish electrical contact with the wire.

9 Claims, 9 Drawing Figures

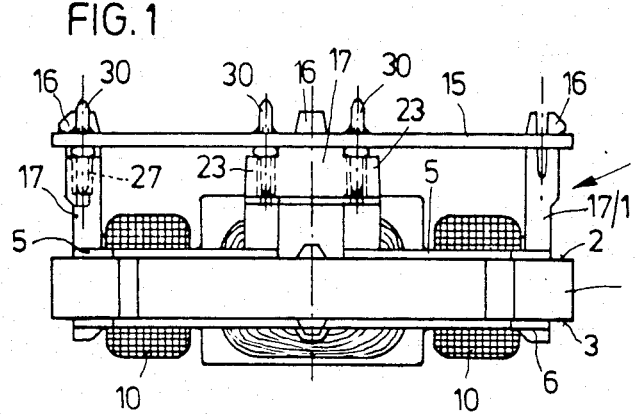
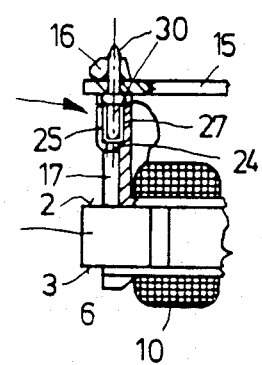
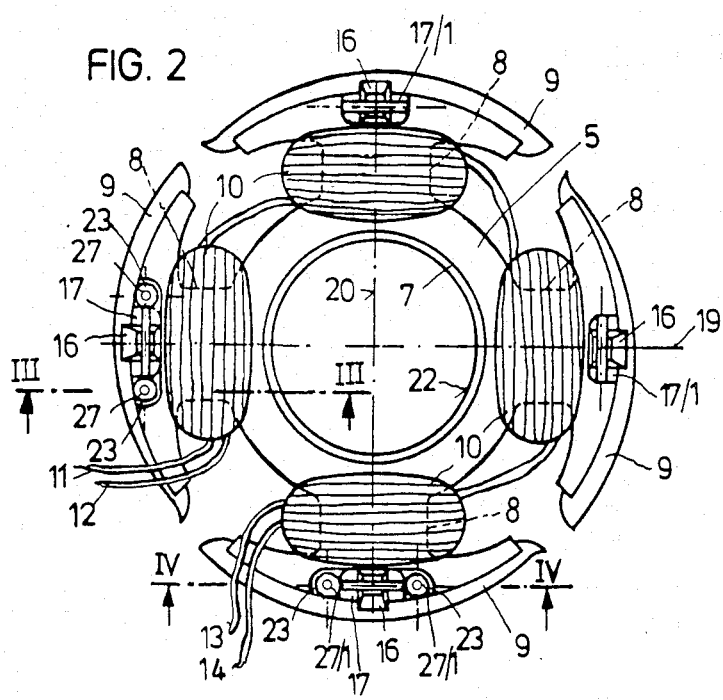
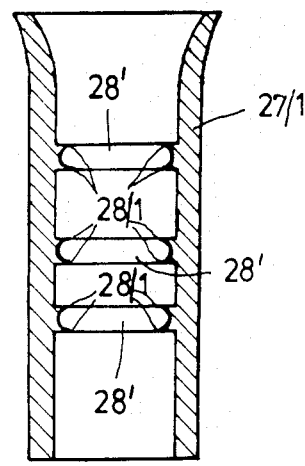
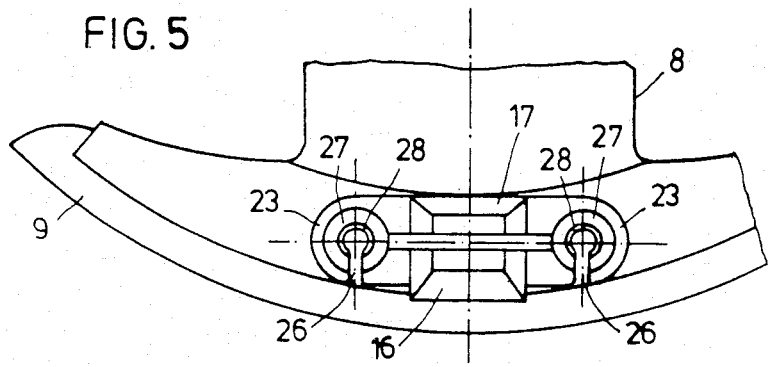

ENAMELLED WIRE CONNECTION FOR CIRCUIT BOARDS

The invention concerns a device for producing an electrically conductive connection between the enamelled wire ends of one or several stator coils of an electrical motor, especially a direct current motor without a collector, and electrical conductors with contact pins, each of which, individually and in common with one or several of the enamelled wires to be contacted, is, by producing a radial compression through which the enamel casing of the enamel wire is in places penetrated or removed in a contacting manner, inserted in the axial direction into the hollow space of an insulating body.

With increased use of electronic components for the control or power supply of devices which have electromagnetic enamelled wire coils, such as, for example, relays, transformers, motors and the like, the use of circuit boards also increases, and therewith as well, the technical problem of how to connect the Cu-enamelled wire ends of the coils of these electromagentic devices to the circuit boards in serial sequence and with adequate contact security. In this, the insulating enamel layer should, for reasons of cost, be removed from the Cu-wire at the connecting place, and a firm connection with the conductor track be produced at the same time. Previously, this was done in such a way that the enamelled wire section to be attached was soldered directly onto a conductor track with a soldering bit. In this, the insulating enamel layer is removed from the wire, and it is necessary that the hot soldering bit be repeatedly guided with a certain bearing pressure over the individual wire, so that the insulating enamel melts, and the exposed wire surface has direct contact with the fluid soldering material. This method is not only very time-consuming, but also entails the danger that, particularly with very thin enamelled wires, the wire section to be joined breaks, or that no electrical contact occurs.

It is, of course, known to provide electrical circuit boards with contact pins which are closely pressed into the borings of the circuit boards, and soldered together with the other construction elements of the circuit boards. These known contact pins are, however, used only where a metallic plug socket which accommodates the contact pin in a clamping manner is present as a fixed contact element.

It is also already known (U.S. Pat. No. 3,014,140) to connect the enamelled wire ends of the coil of a shaded pole motor in a contacting manner with individual contact pins, through the fact that a contact pin section provided with a threading is pressed into a boring of an insulating casing together with an enamelled wire section. Through this, the sharp-edged threads burrow into the enamel casing up to contact with the wire. Connecting strands are joined to the contact pins by means of attachable clamping plates.

Apart from the fact that this manner of producing a contacting connection is only suited for relatively thick enamelled wires, the danger that the wire end, upon insertion of the contact pin into the boring, will break is very great, since the end of the wire is also drawn into the boring.

This task is, in accordance with the invention, solved through the fact that, in circuit boards provided with electronic control elements and attached to the insulating body, several contact pins provided with smooth casing surfaces are attached in a contacting manner, and that the plastic body has, in several borings, axially parallel receptacle terminals of metal, each of which serves to accommodate one of the contact pins, the inner surfaces of which slightly taper conically in the direction of insertion, and/or are provided with riblike elevations which run essentially laterally to the axial direction.

The principal advantage which is to be obtained through this is to be seen in the fact that the electrical contact between the coil wires and the conductive tracks of the printed circuit board and the mechanical attachment of the circuit board occurs in the same work process on the plastic body, and that the danger of breaking or shearing is prevented by the fact that either no sharp-edged parts come into contact with the wire, or that the elevations are positioned on the part which does not move relative to the insulated wire.

The developments of the invention in accordance with claim 2 or 3 are particularly of advantage if thicker enamelled wires are to be contacted.

The development of the invention in accordance with claim 4 not only facilitates the insertion of the connecting enamelled wire ends and the contact pins into the receptacle terminals, but it is also through this prevented that the enamelled wire during the insertion of the contact pin into the receptacle terminals, is drawn over the sharp edge, and thus be possibly damaged.

The use of receptacle terminals in accordance with claim 5 has the advantage that a higher radial elasticity can be attained, through which the contacting of very thin enamelled wires becomes more secure, and through which also enamelled wires with larger differences of thickness can be contacted. Through this, it is furthermore also possible to provide slotting over the entire length of the receptacle terminal.

A very simple connection which corresponds in its motion to the process of insertion of the contact pins into the receptacle terminals can be carried out through the characteristics in accordance with claim 6.

The development of the invention in accordance with claim 7 ensures its advantageous use, particularly in the manufacture of electronically controlled direct current motors without collectors, in which it was previously necessary to connect four ends of winding wires by soldering conductor tracks of a circuit board.

Through the development in accordance with claim 8, in connection with the development in accordance with claims 5 and 7, the machine insertion of the winding ends into the receptacle terminals is facilitated or made possible.

Figure 8:
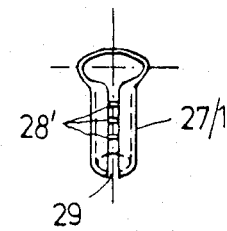
Figure 6:
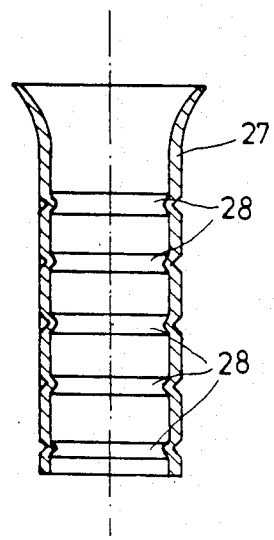
Figure 7:
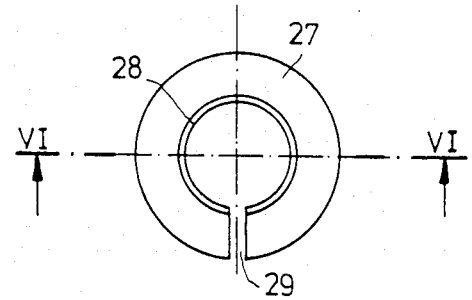

The invention will now be illustrated in greater detail by means of the diagram. These show:

FIG. 1: the stator of a brushless direct current motor in a lateral view, with a circuit board;

FIG. 2: a view from above of FIG. 1, without the circuit board;

FIG. 3: a view III—III of FIG. 2;

FIG. 4: a view IV—IV of FIG. 2, in enlarged representation;

FIG. 5: in enlarged representation, the view from above of a pole blade of the stator of FIGS. 1 and 2;

FIG. 6: a slotted receptacle terminal of metal according to the section line VI—VI from FIG. 7;

FIG. 7: a receptacle terminal of FIG. 6 in an axial view from above;

FIG. 8: another slotted receptacle terminal of metal in a lateral perspective view;

FIG. 9: an enlarged longitudinal section of the receptacle terminal depicted in FIG. 8.

In the stator (1) of a direct current motor depicted in FIGS. 1 and 2 in a lateral view and view from above, insulating cover plates (5 and 6) of plastic are positioned on both frontal sides (2 and 3) of a stack of plates (4) which cover not only the annular internal part (7), but also the radial bars (8) and the large part of the segmented pole piece (9). On the radical bars (8), double coils (10) are coiled, the four enamelled wire ends of which (11, 12, 13, and 14) are to be connected with different conductive tracks of a circuit board (15). For purposes of providing a clearly visible illustration, wire ends (11, 12, 13 and 14) are shown over-sized in the drawings. Accordingly, the figures, and especially FIG. 4 are not drawn to scale, as wire diameters, smaller than those illustrated, are employed in the present invention. The proper sizing of the wire ends, relative to the components of the wire contact connection, will become apparent upon considering the following description. The printed circuit board (15) is fastened by means of the latching catches (16) of fork-shaped slotted supporting fingers (17 and 17/1) of the upper insulating cover plate (5), which run parallel to that at a certain distance from the stack of plates (4).

The slotted ends of the supporting finger (17 and 17/1) thereby project into slot apertures (18) of the support plate (15) see FIGS. 4 to 6). The supporting fingers (17 and 17/1) are each formed symmetrically with the middle axes (19 and 20) of the radial bars (8) on the part sections (21) of the upper insulating covering plate (5) in one piece and partially covering the pole piece (9), which is likewise formed in segments, and formed as to extend in an axial direction. While the two supporting fingers (17/1) are only provided for the attachment of the circuit boards (15), the supporting finger (17), as can best seen from FIGS. 2, 4 and 7, is formed as one piece on both sides with symmetrical positioning to the middle axes (19 and 20), each with two side parts (23), with one boring or passageway (24), each running parallel to the axis of the boring (22) of the stack of plates (4), and slotted receptacle terminals (27 or 27/1) of metal are inserted in the upper expanded section (25) in the form depicted in FIGS. 6 and 7 or in FIGS. 8 and 9 as individual parts. The receptacle terminals (27 and 27/1), as well as the borings (24), are expanded on the upper ends in funnel or trumpet shapes. The internal wall surface of the receptacle terminal may include several annular corrugations or ribs (28'), each of which has two edges (28/1) which can penetrate the enamelled casing of the enamelled wire in a cutting manner under radial compression pressure (see FIG. 9), or, in the alternative, may include a few sharp annular reinforcing corrugations or ribs (28), which are radially driven from the outside to the inside (see FIG. 6). In FIGS. 8 and 9 three such relatively sharp-edged annular corrugations (28') are depicted. The receptacle terminal (27) of FIGS. 6 and 7 has, on the other hand, five annular reinforced corrugations (28). The receptacle terminals (27 and 27/1) are each produced from a rolled sheet, and provided with a slot (29) extending in the axial direction over this entire length, which effect a radial elasticity. The lateral parts (23) are, like the receptacle terminals (27 and 27/1), provided with penetrating axial slots (26) (FIG. 5), in order to also attain a certain radial elasticity of the boring wall, and in order to be able to insert the enamelled wire ends (11 to 14) more easily into the receptacle terminals (27 and 27/1) by machine.

For insertion into the pin-receiving cavities of these receptacle terminals (27 and 27/1), cylindrical contact pins (30) provided with rounded, conical tips and smooth casing surfaces are attached to the circuit board (15). These contact pins (30) each have in their longitudinal center a stop collar (31), up to which they are pressed from the lower side into the circuit board (15). Contact pins (30) are soldered to a conductive component carried by the circuit board, preferably a conductive track or conductive trace located on the surface of the circuit board (15). In order to attach the loose enamelled wire ends (11, 12, 13 and 14) into the receptacle terminals (27 or 27/1) of the borings (24), and at the same time to produce an electrically conductive connection to the contact pins (30), the enamelled wire ends are each individually inserted into one of the receptacle terminals (27 or 27/1) in the manner depicted in FIG. 4, from above or from below, and the contact pins (30), during the positioning of the circuit boards (15) on the supporting finger (17 and 17/1) are subsequently thrust into the receptacle terminal (27). Through this, the internal diameter of the receptacle terminals (27 and 27/1) are so adjusted to the external diameter of the contact pins (30) that a radial clamping effect or compression arises, through which the enamelled wire ends (11 to 14) are pressed against the relatively sharp edges (28/1) of the annular corrugations (28), which then penetrate the enamelled wire layer, and produce a conductive connection to the metal wire. Approximately the same result also appears during the driving of the contact pin (30) into the receptacle terminal (27), with the difference that the annular reinforced corrugations (28) penetrate the enamelled casing of the wire in less a cutting manner than in a squeezing manner, in order to contact the wire, since they are blunter.

Through the fact that the upper ends of the receptacle terminals (27 and 27/1) are expanded in a flared manner, the enamelled wire ends, if they are inserted from above with a loose loop into the receptacles terminals (27), upon insertion of the contact pins (30), execute an axial motion, without the danger of their being damaged at the edges of the receptacle terminals (27).

Since the contact pins (30) used together with the receptacle terminals (27 and 27/1) have a smooth cylindrical casing surface and conically rounded tips, which make an edgeless transition into the cylindrical casing surface, no sharp edges are present on the contact pins (30) themselves, which, in cooperation with the edges (28/1) of the annular corrugations (28') or the reinforced corrugations (28), exert a shearing effect, and can cut the enamelled wire during insertion into the receptacle terminal (27 or 27/1).

While the receptacle terminals (27), with their elevations which consist of reinforced corrugations (28), are suited for thin, as well as for relatively thick enamelled wires, the receptacle terminals (27/1) with the relatively sharp-edged annular corrugations (28') are more advantageous for contacting extremely thin enamelled wires.

It is also possible to use unslotted receptacle terminals, that is, ones which are smooth all around, which have smooth internal wall surfaces, together with likewise smooth contact pins (30), for contacting with enamelled wires, if the diameter tolerances are precisely dimensioned to the wire strength, and an increased force is tolerated. In this, it is of advantage if the smooth internal surfaces taper slightly conically in the direction of insertion, and are, for example, on the insertion side, around a wire thickness further than the end of the insertion length.

I claim:

1. An arrangement for providing an electrical connection to the enamelled wires of the coil of an electrical motor, comprising, in combination:
   a circuit board carrying at least one conductive component;
   a conductive pin-type contact carried by said circuit board and electrically connected to said conductive component;
   an insulating body carried by said electrical motor, said insulating body defining at least two receptacle-receiving passageways therein; and
   conductive-pin receiving terminals having wall means defining a pin-receiving cavity and engaging means associated with said wall for electrical engagement with one said enamelled wire and one said pin-type contact inserted into said cavity, said engaging means operative to penetrate the enamel covering said wire to establish electrical contact with said wire and said pin.

2. The combination of claim 1 wherein said motor further includes latching means carried by said insulating body for latching to said circuit board, said receptacle terminals arranged to mate with said pin-type contacts as said latching means are latched to said circuit board.

3. The combination of claim 1 wherein said engaging means comprise inwardly-extending rib members formed in said receptacle terminal.

4. The combination of claim 1 wherein said receptacle terminal has a pin-receiving end and defines a slot extending from said pin-receiving end along at least two-thirds the length of said receptacle terminal.

5. The combination of claim 1 wherein said insulating body is supported by a stack of plates of the motor.

6. The combination of claim 1 wherein said engaging means comprises an end section of said receiving terminal wall conically tapered in the direction of insertion.

7. The combination of claim 3 wherein each said rib member has a single edge for penetrating the enamel covering said wire.

8. The combination of claim 3 wherein each said rib member has two edges for penetrating the enamel covering said wire.

9. The combination of claim 1 wherein said insulating body includes wall means defining said receptacle-receiving passageways, said wall means slotted along their length to produce a resiliently-expandable passageway which augments the mating contact force of said engaging means with said pin-type contact.

* * * * *

UNITED STATES PATENT AND TRADEMARK OFFICE
CERTIFICATE OF CORRECTION

PATENT NO.  : 4,673,834

DATED       : June 16, 1987

INVENTOR(S) : Guenter Wrobel

It is certified that error appears in the above-identified patent and that said Letters Patent is hereby corrected as shown below:

```
Col. 1, Line 12, after "compression" insert --,--.
Col. 1, Line 20, after "well" delete ",".
Col. 1, Line 22, change "electromagentic" to --electromagnetic--.
Col. 1, Lines 44-45, change "used only" to --only used--.
Col. 2, Line 2, after "which" insert --,--.
Col. 2, Line 26, change "terminals" to --terminal--.
Col. 3, Line 9, change "radical" to --radial--.
Col. 3, Line 11, after "coiled" delete ",".
Col. 3, Line 28, before "see" insert --(--.
Col. 3, Line 63, change "effect" to --effects--.

Col. 4, Line 41, change "receptacles" to --receptacle--.
Col. 4, Line 67, after "increased" insert --insertion--.
Col. 4, Line 68, after "this" delete ",".
```

Signed and Sealed this

Twenty-second Day of December, 1987

*Attest:*

DONALD J. QUIGG

*Attesting Officer*  *Commissioner of Patents and Trademarks*